United States Patent Office 2,823,191
Patented Feb. 11, 1958

2,823,191

STABILIZED CHLORO-ETHYLENE POLYMER-CONTAINING LACQUER

Werner Gysin, Ludwigshafen (Rhine), Germany, assignor to Badische Anilin- & Soda-Fabrik Aktiengesellschaft, Ludwigshafen (Rhine), Germany No Drawing. Application November 30, 1954
Serial No. 472,203

Claims priority, application Germany December 2, 1953

8 Claims. (Cl. 260—30.4)

This invention relates to lacquers comprising a solution of a copolymer of a chlorvinyl compound and at least one other polymerizable compound having an ethylenic unsaturation in organic solvents and also containing a compound having at least one ethylene imine group. It relates further to coatings prepared therefrom.

It is already known that vinyl polymers soften to a greater or less extent at raised temperature. Moreover they are not stable to a number of organic solvents and in this respect are even inferior to chlororubber which upon being aged, if desired with the co-employment of vulcanization additives, becomes substantially insoluble and thus stable to a series of organic solvents.

I have now found that lacquers and coatings having especially good properties can be prepared by combining solutions of copolymers of a chlorvinyl compound and at least one other chlorvinyl compound and/or at least one chlorine-free polymerizable compound with solutions of polyethylene-imine in organic solvents or with monomeric ethylene imine. By chlorvinyl compound is meant either vinyl chloride or vinylidene chloride.

Suitable chlorvinyl compounds for the production of the copolymers are for example vinyl chloride and vinylidene chloride. The copolymers may contain about 10 to 96%, preferably about 40 to 96%, of the chlorvinyl compound.

Among the chlorine-free polymerizable compounds which may be polymerized together with the chlorvinyl compounds there may be mentioned for example vinyl ethers, as for example vinyl butyl ether and vinyl isobutyl ether, acrylic and methacrylic acid esters, vinyl esters and maleic acid. Suitable solvents for the said copolymers are preferably mixtures of partially etherified polyhydric alcohols, as for example ethylene glycol monoethyl or monomethyl ether with hydrocarbons, as for example tetrahydronaphthalene, toluene, esters of organic acids, as for example ethyl or butyl acetate, ketones, ethers, as for example tetrahydrofurane, and mixtures of these. The polyethylene imine is also used dissolved in organic solvents, as for example in ethylene glycol monoalkyl ethers. It is especially favorable to use about 0.5 to 20% of ethylene imine or polyethylene imine, with reference to the polymer or copolymer, but in many cases smaller or larger amounts may also be used. The monomeric ethylene imine can also be used dissolved in organic solvents if desired.

There may preferably be added to the solutions unsaponifiable softening agents, as for example chlorinated hydrocarbons, such as chlorinated diphenyl compounds or chlorinated paraffins, and resins, as for example cyclohexanone resins, or etherified acetylene diurea-formaldehyde condensation products. Moreover they may contain pigments which as far as possible should be chemically inert, as for example titanium dioxide, iron oxide red, chromium oxide green, silicon carbide, heavy spar, quartz or talc. The resultant lacquer solutions dry in the air or can be stoved for example at temperatures above 100° C. The coatings obtained are substantially stable to solvents and very waterproof. Their softening range is raised and the heat stability of the copolymers is favorably influenced by the addition of polyethylene imine or monomeric ethylene imine. The products can be mechanically stressed at temperatures above 100° C. whereas the copolymers used usually begin to soften at about 65° C.

The following examples will further illustrate this invention but the invention is not restricted to these examples. The parts are parts by weight.

*Example 1*

10 parts of a 10% solution of polyethylene imine in ethylene glycol monoethyl ether are added to 100 parts of a 20% solution of a copolymer from 75 parts of vinyl chloride and 25 parts of vinyl isobutyl ether in a mixture of toluene and ethylene glycol monoethyl ether in the ratio 1:1. Pigments, as for example titanium dioxide or iron oxide red, may be added to the resultant mixture. The whole is mixed thoroughly and applied by the conventional methods. After air-drying an adherent, elastic coating is obtained having a good gloss and surface hardness. It is stable at temperatures up to about 100° C.

*Example 2*

100 parts of a 20% solution of a copolymer from 75 parts of vinyl chloride and 25 parts of vinyl butyl ether in a solvent mixture of ethyl acetate, butyl acetate, toluene and ethylene glycol monomethyl ether in the ratio 1:1:1:1 are mixed with 8 parts of a 10% polyethylene imine solution in ethylene glycol monoethyl ether. The thoroughly mixed solution, which may also contain inert pigments and unsaponifiable resins and/or softening agents, is applied by the methods conventional in the lacquer industry. After a short surface drying in the air, the coating is heated, for example in an electric drying cabinet, for an hour at 120° to 130° C. A pale colored coating thus becomes slightly yellower, while the adhesion and surface hardness are increased. Moreover the coating becomes substantially insensitive to solvents, waterproof and elastic without the high stability to chemicals of the vinyl chloride copolymer used being reduced. A lacquering prepared in this way can be exposed to temperatures considerably above 100° C. for long periods.

*Example 3*

5 parts of monomeric ethylene imine are added to 100 parts of a 20% solution of a copolymer from 70 parts of vinyl chloride and 30 parts of butyl acrylate in ethyl acetate and ethylene glycol monoethyl ether in the ratio 1:1. The thoroughly mixed solution, which may also contain unsaponifiable resins and softening agents as well as inert pigments, is applied in conventional fashion. After a short preliminary drying the coating is stoved for example for 2 hours at 120° C. in a steam-heated drying chamber. A slight yellowing is observed. The resultant coatings are proof against water, chemicals and solvents, very elastic and adherent. They can be exposed to temperatures above 100° C.

*Example 4*

7.5 parts of a 10% solution of polyethylene imine in ethylene glycol monomethyl ether are added to 100 parts of a 15% solution of a copolymer from 87 parts of vinyl chloride and 13 parts of vinyl acetate in a solvent mixture of ethyl acetate, butyl acetate, toluene, and ethylene glycol acetate monomethyl ether in the ratio of 2:1:1:1 and mixed well. The mixture, which may also contain unsaponifiable resins and/or softening agents as well as inert pigments, is applied to a support and, after a short drying in the air, stoved in an electric drying chamber for about 1 to 2 hours at about 130° to 160° C. The yellowish coating exhibits a good resistance to chemicals, solvents and water and may be used at temperatures above 100° C.

*Example 5*

10 parts of a 10% solution of polyethylene imine in ethylene glycol monoethyl ether are added to 100 parts of a 20% solution of a copolymer from 84 parts of vinyl chloride, 15 parts of vinyl propionate, and 1 part of maleic acid in a mixture of ethyl acetate and ethylene glycol monomethyl ether in the ratio 3:1 and well mixed. This mixture is applied to a support and, after a short drying in the air, heated for about 1 to 2 hours at about 120° to 140° C. The resultant coating has a good stability to chemicals, solvents, and water, good adherence and elasticity and can be exposed to temperatures considerably above 100° C.

*Example 6*

20 parts of a copolymer from 30 parts of vinylidene chloride and 70 parts of vinyl chloride are dissolved in 80 parts of a solvent mixture of toluene, xylene, ethylene glycol monomethyl ether and cyclohexanone in the ratio 1:1:1:1. 10 parts of a 20% polyethylene imine solution in ethylene glycol monomethyl ether are added to this solution. To this mixture there are added 10 parts of chromium oxide green by one of the conventional methods, as for example by trituration through a funnel mill or by grinding in a ball mill. It is mixed thoroughly and the mixture applied by the methods usual in the lacquer industry. After a short preliminary drying in the air, the coating is heated, for example in an electric drying cabinet, for an hour at 100° to 120° C. A coating is obtained which exhibits improved mechanical properties, a far higher softening range and a better stability to solvents as compared with a coating prepared without the use of polyethylene imine. The stability to chemicals and water of the copolymer used is not impaired by the addition of polyethylene imine but is retained to its full extent.

*Example 7*

20 parts of a copolymer of 75 parts of vinyl chloride and 25 parts of vinyl isobutyl ether are dissolved in 80 parts of a solvent mixture of toluene, xylene, ethylene glycol monomethyl ether and cyclohexanone in the ratio 1:1:1:1. 2 parts of unsaponifiable cyclohexanone resin and 4 parts of chlorinated diphenyl are then added to the solution. The solution is stirred until the cyclohexanone resin and the chlorinated diphenyl have passed completely into solution. 5 parts of iron oxide red and 10 parts of silicon carbide are then added by one of the conventional methods, for example by grinding in a porcelain ball mill. While stirring intensively there are then added to this pigmented solution 20 parts of a 20% solution of polyethylene imine in ethylene glycol monomethyl ether. The resultant mixture can be applied by one of the conventional methods, as for example with a spraygun. After a short preliminary drying in the air, the coating is heated in a heating cabinet for about an hour at 100° to 130° C. A tough, hard but nevertheless elastic coating is obtained with a remarkable stability against many solvents and improved thermal properties which permit of the coating being mechanically stressed at temperatures above 110° C. Films or coatings prepared by the said method of operation but without polyethylene imine have no stability to solvents and cannot be mechanically stressed at temperatures above 60° C. or at the most 70° C.

I claim:

1. An improved lacquer composition comprising a solution in an organic lacquer solvent of (A) an imino compound from the group consisting of ethyleneimine and polyethyleneimine, and (B) a copolymer of (1) a chlorine-containing monomer from the group consisting of vinyl chloride and vinylidene chloride, and (2) at least one polymerizable monomeric monoethylenic compound capable of copolymerizing with said chlorine-containing monomer.

2. A lacquer composition as claimed in claim 1 wherein said copolymer is a copolymerization product of vinyl chloride and vinylidene chloride.

3. A lacquer composition as claimed in claim 1 wherein said copolymer is a copolymerization product of vinyl chloride and a vinylether.

4. A lacquer composition as claimed in claim 1 wherein said copolymer is a copolymerization product of vinyl chloride and vinylisobutylether.

5. A lacquer composition as claimed in claim 1 wherein said copolymer is a copolymerization product of vinyl chloride and an acrylic acid ester.

6. A lacquer composition as claimed in claim 1 wherein said copolymer is a copolymerization product of vinyl chloride and an acrylic acid butyl ester.

7. A lacquer composition as claimed in claim 1 wherein said imino compound is polyethyleneimine.

8. A lacquer composition as claimed in claim 1 wherein said imino compound is ethyleneimine.

References Cited in the file of this patent

UNITED STATES PATENTS

| | | |
|---|---|---|
| 2,381,020 | Wilkes et al. | Aug. 7, 1945 |
| 2,403,960 | Stoops et al. | July 16, 1946 |
| 2,514,185 | Eberly | July 4, 1950 |